United States Patent
Ferry et al.

(10) Patent No.: US 8,719,080 B2
(45) Date of Patent: May 6, 2014

(54) SYSTEM AND METHOD FOR SCHEDULING ADVERTISEMENTS

(75) Inventors: Matthew Ferry, Lake Forest, CA (US); Thomas McCartan, Mission Viejo, CA (US)

(73) Assignee: Clear Channel Management Services, Inc., San Antonio, TX (US)

( * ) Notice: Subject to any disclaimer, the term of this patent is extended or adjusted under 35 U.S.C. 154(b) by 2092 days.

(21) Appl. No.: 11/419,492

(22) Filed: May 20, 2006

(65) Prior Publication Data

US 2007/0271134 A1    Nov. 22, 2007

(51) Int. Cl.
*G06Q 30/00* (2012.01)

(52) U.S. Cl.
USPC ........................................................ 705/14.1

(58) Field of Classification Search
USPC ........................................................ 705/14.1
See application file for complete search history.

(56) References Cited

U.S. PATENT DOCUMENTS

| | | | |
|---|---|---|---|
| 5,592,375 A | 1/1997 | Salmon et al. |
| 5,671,411 A | 9/1997 | Watts et al. |
| 6,026,369 A | 2/2000 | Capek |
| 6,061,691 A | 5/2000 | Fox |
| 6,253,187 B1 | 6/2001 | Fox |
| 6,286,005 B1 | 9/2001 | Cannon |
| 6,338,043 B1 | 1/2002 | Miller |
| 6,567,824 B2 | 5/2003 | Fox |
| 6,873,969 B2 | 3/2005 | Stone et al. |
| 6,920,464 B2 | 7/2005 | Fox |
| 6,937,996 B1 | 8/2005 | Forsythe et al. |
| 6,985,882 B1 | 1/2006 | Del Sesto |
| 2001/0020236 A1* | 9/2001 | Cannon .............................. 707/1 |
| 2002/0002517 A1 | 1/2002 | Fox |
| 2002/0083439 A1 | 6/2002 | Eldering |
| 2002/0188487 A1 | 12/2002 | Fox |
| 2003/0001880 A1 | 1/2003 | Holtz et al. |
| 2003/0070167 A1 | 4/2003 | Holtz et al. |
| 2003/0101454 A1 | 5/2003 | Ozer et al. |
| 2003/0110171 A1 | 6/2003 | Ozer et al. |
| 2003/0154142 A1 | 8/2003 | Ginsburg et al. |
| 2003/0214605 A1 | 11/2003 | Snyder et al. |
| 2003/0225629 A1 | 12/2003 | Banks et al. |
| 2003/0229536 A1 | 12/2003 | House et al. |
| 2004/0153366 A1 | 8/2004 | Olson et al. |
| 2004/0186737 A1 | 9/2004 | Roberts |
| 2004/0236794 A1 | 11/2004 | Fox |

(Continued)

FOREIGN PATENT DOCUMENTS

| | | |
|---|---|---|
| EP | 1026610 | 8/2000 |
| WO | WO0013109 | 8/1999 |

(Continued)

OTHER PUBLICATIONS

Ding et al.; "A heuristic algorithm for agent-based grid resource discovery." College of Computer Science and Technology, Jilin University, Changchun, Jilin, China.

(Continued)

*Primary Examiner* — Daniel Lastra
(74) *Attorney, Agent, or Firm* — Garlick & Markison; Edward J. Marshall

(57) ABSTRACT

There is disclosed a computerized system and method for scheduling advertising events which utilizes a set of configurable instructions regarding booking an order which iterates through a series of broadening, configurable criteria and also implements a configurable scoring system for the purpose of comparing multiple Events to determine if one Event is more valuable than the other.

22 Claims, 10 Drawing Sheets

(56) References Cited

U.S. PATENT DOCUMENTS

| | | |
|---|---|---|
| 2004/0243266 A1 | 12/2004 | Mata et al. |
| 2004/0243470 A1 | 12/2004 | Ozer et al. |
| 2005/0022199 A1 | 1/2005 | Davis |
| 2005/0171897 A1 | 8/2005 | Forsythe et al. |
| 2005/0283795 A1 | 12/2005 | Steelberg et al. |
| 2006/0036490 A1 | 2/2006 | Sagalyn |
| 2006/0287915 A1 * | 12/2006 | Boulet et al. .................... 705/14 |

FOREIGN PATENT DOCUMENTS

| | | |
|---|---|---|
| WO | WO0219058 | 3/2002 |
| WO | WO03014949 | 2/2003 |
| WO | WO03030011 | 4/2003 |
| WO | WO03060647 | 7/2003 |
| WO | WO03095682 | 11/2003 |
| WO | WO03102742 | 12/2003 |
| WO | WO2005015469 | 2/2005 |

OTHER PUBLICATIONS

Zufryden: "Media scheduling and solution approaches." Operational Research Quarterly, (1975) vol. 26, No. 2(i). 283-295.

International Searching Authority/US, International Search Report in PCT/US2007/011675, Nov. 10, 2011, 3 pgs, US.

* cited by examiner

Sample Inventory Structure

Legend
Bold=Island
*Italic=Advertiser Separation, PremiumFirst, Premium Last, Unplaced, Bookend*
Plain=Vertical Rotation
Blank Rows= Programming

|  | Day 1-<br>24<br>Hours | Day 2-<br>24<br>Hours | Day 3-<br>24<br>Hours | Day 4-<br>24<br>Hours | Day 5-<br>24<br>Hours | Day 6-<br>24<br>Hours | Day 7-<br>24<br>Hours |
|---|---|---|---|---|---|---|---|
| Pod 1<br>1:30-<br>1:35 | *Break 1<br>- Unit 1<br>Break 1<br>- Unit 2<br>Break 1<br>- Unit 3<br>Break 1<br>- Unit 4<br>Break 1<br>- Unit 5* | *Break 1<br>- Unit 1<br>Break 1<br>- Unit 2<br>Break 1<br>- Unit 3<br>Break 1<br>- Unit 4<br>Break 1<br>- Unit 5* | *Break 1<br>- Unit 1<br>Break 1<br>- Unit 2<br>Break 1<br>- Unit 3<br>Break 1<br>- Unit 4<br>Break 1<br>- Unit 5* | *Break 1<br>- Unit 1<br>Break 1<br>- Unit 2<br>Break 1<br>- Unit 3<br>Break 1<br>- Unit 4<br>Break 1<br>- Unit 5* | *Break 1<br>- Unit 1<br>Break 1<br>- Unit 2<br>Break 1<br>- Unit 3<br>Break 1<br>- Unit 4<br>Break 1<br>- Unit 5* | *Break 1<br>- Unit 1<br>Break 1<br>- Unit 2<br>Break 1<br>- Unit 3<br>Break 1<br>- Unit 4<br>Break 1<br>- Unit 5* | *Break 1<br>- Unit 1<br>Break 1<br>- Unit 2<br>Break 1<br>- Unit 3<br>Break 1<br>- Unit 4<br>Break 1<br>- Unit 5* |
| Pod 2<br>4:30-<br>4:33 | Break 2<br>- Unit 1<br>Break 2<br>- Unit 2<br>Break 2<br>- Unit 3 | Break 2<br>- Unit 1<br>Break 2<br>- Unit 2<br>Break 2<br>- Unit 3 | Break 2<br>- Unit 1<br>Break 2<br>- Unit 2<br>Break 2<br>- Unit 3 | Break 2<br>- Unit 1<br>Break 2<br>- Unit 2<br>Break 2<br>- Unit 3 | Break 2<br>- Unit 1<br>Break 2<br>- Unit 2<br>Break 2<br>- Unit 3 | Break 2<br>- Unit 1<br>Break 2<br>- Unit 2<br>Break 2<br>- Unit 3 | Break 2<br>- Unit 1<br>Break 2<br>- Unit 2<br>Break 2<br>- Unit 3 |
| Pod 3<br>7:30-<br>7:33 | Break 3<br>- Unit 1<br>Break 3<br>- Unit 2<br>Break 3<br>- Unit 3 | Break 3<br>- Unit 1<br>Break 3<br>- Unit 2<br>Break 3<br>- Unit 3 | Break 3<br>- Unit 1<br>Break 3<br>- Unit 2<br>Break 3<br>- Unit 3 | Break 3<br>- Unit 1<br>Break 3<br>- Unit 2<br>Break 3<br>- Unit 3 | Break 3<br>- Unit 1<br>Break 3<br>- Unit 2<br>Break 3<br>- Unit 3 | Break 3<br>- Unit 1<br>Break 3<br>- Unit 2<br>Break 3<br>- Unit 3 | Break 3<br>- Unit 1<br>Break 3<br>- Unit 2<br>Break 3<br>- Unit 3 |

FIG. 2A

| Pod 5<br>13:30-<br>13:35 | Break 5<br>- Unit 1<br>Break 5<br>- Unit 2<br>Break 5<br>- Unit 3 | Break 5<br>- Unit 1<br>Break 5<br>- Unit 2<br>Break 5<br>- Unit 3 | Break 5<br>- Unit 1<br>Break 5<br>- Unit 2<br>Break 5<br>- Unit 3 | Break 5<br>- Unit 1<br>Break 5<br>- Unit 2<br>Break 5<br>- Unit 3 | Break 5<br>- Unit 1<br>Break 5<br>- Unit 2<br>Break 5<br>- Unit 3 | Break 5<br>- Unit 1<br>Break 5<br>- Unit 2<br>Break 5<br>- Unit 3 | Break 5<br>- Unit 1<br>Break 5<br>- Unit 2<br>Break 5<br>- Unit 3 |
|---|---|---|---|---|---|---|---|
| | Break 5<br>- Unit 4<br>Break 5<br>- Unit 5 | Break 5<br>- Unit 4<br>Break 5<br>- Unit 5 | Break 5<br>- Unit 4<br>Break 5<br>- Unit 5 | Break 5<br>- Unit 4<br>Break 5<br>- Unit 5 | Break 5<br>- Unit 4<br>Break 5<br>- Unit 5 | Break 5<br>- Unit 4<br>Break 5<br>- Unit 5 | Break 5<br>- Unit 4<br>Break 5<br>- Unit 5 |
| Pod 6<br>16:30-<br>16:33 | Break 6<br>- Unit 1<br>Break 6<br>- Unit 2<br>Break 6<br>- Unit 3 | Break 6<br>- Unit 1<br>Break 6<br>- Unit 2<br>Break 6<br>- Unit 3 | Break 6<br>- Unit 1<br>Break 6<br>- Unit 2<br>Break 6<br>- Unit 3 | Break 6<br>- Unit 1<br>Break 6<br>- Unit 2<br>Break 6<br>- Unit 3 | Break 6<br>- Unit 1<br>Break 6<br>- Unit 2<br>Break 6<br>- Unit 3 | Break 6<br>- Unit 1<br>Break 6<br>- Unit 2<br>Break 6<br>- Unit 3 | Break 6<br>- Unit 1<br>Break 6<br>- Unit 2<br>Break 6<br>- Unit 3 |
| Pod 7<br>19:30-<br>19:33 | Break 7<br>- Unit 1<br>Break 7<br>- Unit 2<br>Break 7<br>- Unit 3 | Break 7<br>- Unit 1<br>Break 7<br>- Unit 2<br>Break 7<br>- Unit 3 | Break 7<br>- Unit 1<br>Break 7<br>- Unit 2<br>Break 7<br>- Unit 3 | Break 7<br>- Unit 1<br>Break 7<br>- Unit 2<br>Break 7<br>- Unit 3 | Break 7<br>- Unit 1<br>Break 7<br>- Unit 2<br>Break 7<br>- Unit 3 | Break 7<br>- Unit 1<br>Break 7<br>- Unit 2<br>Break 7<br>- Unit 3 | Break 7<br>- Unit 1<br>Break 7<br>- Unit 2<br>Break 7<br>- Unit 3 |
| Pod 8<br>22:30-<br>22:31 | Break 8<br>- Unit 1 | Break 8<br>- Unit 1 | Break 8<br>- Unit 1 | Break 8<br>- Unit 1 | Break 8<br>- Unit 1 | Break 8<br>- Unit 1 | Break 8<br>- Unit 1 |

FIG. 2B

Pseudo Code for evaluating criteria for the Booking Score using 1) Priority; 2) Event Rate; 3) Client Since Date; and 4) Order Date.

Scoring Algorithm Reference

The Event scoring algorithm used by the Booking Agent is called "Get Relative Value." Get Relative Value is the result of four tasks:

1. Determine a common scale for each parameter.
2. Calculate position within that scale. The result of this calculation represents the relative value for each parameter.
3. Weight the relative value.
4. Total the results.

Determine a Common Scale for Each Parameter

Booking Agent calculates the "spread" between a parameter's Maximum possible value and its Minimum possible value to determine the Scale:

Maximum - Minimum = Scale

Minimum and Maximum values are assigned in System Data. For example, Priority could be assigned a minimum of 10 and a maximum of 100. Therefore, the Scale would be 90.

Calculate Position within that Scale

Position represents the parameter's relative value and is calclated by relating the offset of the parameter's value from its Minimum possible value relative to its scale.

Value - Minimum / Scale = Relative Value or

Value - Minimum / Maximum - Minimum = Relative Value

The parameter's Value is entered on the order line by the user. Continuing with the above example,
    if a user enters a value of 80 on the order line for Priority, then: 80 - 10 / 90 = .77 or    80 - 10 / 100 - 10 = .77

Weight the Relative Value

Weight is a whole number representing a portion of 100, and is therefore a percentage. The total of all weights for all parameters used in computing the Booking Score for an

FIG. 5A

Event must always equal 100. Each parameter used in calculating Booking Score is assigned a weighted value in System Data.
For the third step of the algorithm, multiply the Relative Value by the Weight:
Relative Value * Weight = Weighted Relative Value
or Value - Minimum / Maximum - Minimum * Weight = Weighted Relative Value Continuing with the example above, if the user entered a value of 50 for the Priority parameter weight in System Data, then: .77 * 50 = 38.5

Total the Results

Finally, total the calculated values for each parameter and multiply by 100.

For ease of understanding when displayed to the user, the result is multiplied by 100 in order to retain at least two significant digits before converting to an Integer. Any remaining significant digits are truncated as illustrated in the following detailed example.

Detailed Example

The following example illustrates the algorithm used for a Booking Score with four parameters configured in System Data: Priority, Rate, Client Since, and Ordered Date. Minimum, Maximum and Weight are defined in System Data.
OL Value is the value assigned by the user on the order line.

Priority

| | | | |
|---|---|---|---|
| OL Value | | | = 80 |
| Minimum | | | = 10 |
| Maximum | | | = 100 |
| Scale | = 100 - 10 | | = 90 |
| Relative Value (RV) | = (80 - 10) / 90 | = 70 / 90 | = .77 |
| Weighted RV | = .77 * 50 | | = 38.5 |

Rate

| | | | |
|---|---|---|---|
| OL Value | | | = 35 |
| Minimum | | | = 1 |
| Maximum | | | = 1000 |
| Scale | = 1000 - 1 | | = 999 |
| Relative Value (RV) | = (35 - 1) / 999 | = 34 / 999 | = .0340 |
| Weighted RV | = .0340 * 25 | | = .85 |

FIG. 5B

Client Since (calculated value is: Today's Date - Client Start Date)

| | | | |
|---|---|---|---|
| Calculated Value | = 5 / 30 / 05 - 2 / 2 / 04 | | = 481 |
| Minimum | | | = 366 |
| Maximum | | | = 3650 |
| Scale | = 3650 - 366 | | = 3284 |
| Relative Value (RV) | = (481 - 366) / 3284 | = 115 / 3284 | = .035 |
| Weighted RV | = .035 * 15 | | = .525 |

Orcered Date (calculated value is: Order Date - Today's Date)

| | | | |
|---|---|---|---|
| Calculated Value | = (5 / 30 / 05 - 5 / 1 / 05 | | = 30 |
| Minimum | | | = 1 |
| Maximum | | | = 365 |
| Scale | = 365 - 1 | | = 364 |
| Relative Value (RV) | = (30 - 1) / 364 | = 29 / 364 | = .035 |
| Weighted RV | = .035 * 10 | | = .35 |

| | | | |
|---|---|---|---|
| Total | = 38.5 + .85 + .525 + .35 | = 40.225 | |
| | | | * 100 |
| | | | = 4022.5 |
| | | | = (Integer) 4022 |

FIG. 5C

| General Information | Sample Value | Meaning |
| --- | --- | --- |
| Product: | [List Product Name] | List of current commercial product name |
| Product Version: | 4.0.19 | Current version of the product suite |
| BA Service Version: | 2.0.69 | Current version of the Booking Agent engine |
| BA Service Started at: | 10 / 23 / 2005  23:59 | date/time the service started |
| Current Status: | Active | Can be active or paused (red if paused) |
| Threads Running: | 3 | number of threads the service is using |
| Busy Rate Since Starting: | 29% | % of time the Booking Agent has been working (total cycle time / time since start, shown as a %) |
| Peak Events per Second: | 264 | The highest Events per second second achieved from any cycle |
| Cycles Completed | 357 | Total number of cycles completed |

| Active Cycle - Started 10 / 24 / 05   11:38:34 | | Title - Active Cycle - Started [list the date/time the cycle started] |
| --- | --- | --- |
| Items Considered: | 23049 | total number of occasions picked up for booking |
| Items Booked: | 15663 | total number of Events booked into schedule, so far |
| Items Pooled: | 466 | total number of Events sent to the pool, so far (including any that are not part of the set of occasions |
| Bump Decisions: | 1233 | total number of Events that have been moved (to pool or somewhere else) during this cycle, so far |
| Churn: | 7.87% | bump decisions / items booked, formatted as a percentage - a rough measure of efficiency |
| Events per Second: | 232 | Number of Events per second, so far |

FIG. 6A

| | | Title - Last Complete Cycle - Completed [list the date/time the cycle finished] |
|---|---|---|
| Last Complete Cycle - Completed | 10 / 24 / 05   11:37:03 | |
| Cycle Run Time | 554 | total duration in seconds |
| Items Considered: | 459923 | total number of occasions picked up for booking in this cycle |
| Items Booked: | 43232 | total number of Events booked into schedule for this cycle |
| Items Pooled: | 34233 | total number of Events sent to the pool during this cycle (even ones from other previously processed orders) |
| Bump Decisions: | 28998 | total number of Events that have been moved (to elsewhere on the schedule or pool) during this cycle |
| Churn: | 67.08% | bump decisions / items booked, formatted as a percentage - a rough measure of efficiency |
| Events per Second: | 245 | Events per second achieved during this cycle |

| | | these aggregates are updated with each cycle that completes |
|---|---|---|
| Aggregate Data: All Completed Cycles Since Startup | | |
| Items Considered: | 43423343 | total number of occasions considered during all completed cycles |
| Items Booked: | 39232321 | total number of Events booked into schedule, for all completed cycles |
| Items Pooled: | 233423 | total number of Events sent to the pool for all completed cycles |
| Bump Decisions: | 11232123 | total number of Events that have been moved (to pool or elsewhere on schedule) during all completed cycles |
| Churn: | 28.63% | bump decisions / items booked, from all completed cycles, formatted as a percentage |
| Events per Second: | 221 | total Events per second / number of completed cycles - average Events per second for all completed cycles |

FIG. 6B

SYSTEM AND METHOD FOR SCHEDULING ADVERTISEMENTS

PREAMBLE

This is a non-provisional patent application.

BACKGROUND OF THE INVENTION

Scheduling systems for booking advertisements are dependent upon programmatic solutions which schedule advertising Events according to a variety of criteria and which effectively deal with overbooking scenarios. Prior art systems evidence a need in the industry for further functionality and flexibility in a system for scheduling advertisements.

SUMMARY

A scheduling engine/system, comprising a computer-readable medium comprising computer-executable instructions, is disclosed which allows for the scheduling of Events within specific schedules based on certain scheduling criteria. It is applicable to a broad range of media including, but not limited to, radio, television, billboards, and the Internet.

Sales personnel may sell advertising time to clients and submit an order form covering the details of the sale/Order to a scheduling system. In an alternative embodiment, clients may enter orders directly through an interface to a scheduling system. A scheduling system may be programmed to set up a schedule and/or set up scheduling placement criteria within the schedule which may be used by a program to optimize the schedule based on user-defined criteria. A user refers to a person who utilizes and/or configures embodiments of the invention to create an advertising schedule. Placement criteria may include, but not be limited to, Event priority; Event value; Event acceptable time period range; maximum number of Events of a specific type per schedule; specifically requested time placement within a schedule; placement based on relativity to other Events with certain criteria; placement based on relativity to the same Event being scheduled on other schedules.

Upon entry of an order into the scheduling system, the system may compare available slots with the order specifications. If slots are available, the scheduling system may book the orders as Events, otherwise it may look for less important Events to Bump via a series of criteria entered on the order. Bumped Events and/or rejected orders may be added as Events to a Pool of available Events for scheduling. The scheduling system may periodically reconsider Events in the Pool and take Events from the Pool and place them within the schedule as possible. Events may be aired and billed based on their placement via a billing system and On-Air System in communication with the scheduling system.

Users may directly refine a generated schedule and may also lock Events to prEvent them from being programmatically manipulated. Separate Events may be combined to create an Event Group that can be scheduled as a single entity. Event criteria may also be updated which may trigger regeneration of a schedule based on the newly updated criteria. Such a system is preferably scalable and may utilize multiple threads to effect the placement of Events into separate schedules concurrently (although the embodiments disclosed herein may also be applied to a non-scalable system). Booking may be segregated by an Advertising Provider so that each thread within each instance of a Booking Agent only works for that Advertising Provider.

For purposes of clarity, when a method/system/interface is set down in terms of acts, steps, or components configured to perform certain functions, it should be understood that the described embodiment is not necessarily intended to be limited to a particular order.

Definitions

Some terms will be beneficial to understanding embodiments of the invention disclosed herein.

Account Executive (AE) may be a sales representative who meets with Clients/Advertisers/Agencies to negotiate and create proposals.

Advertising Provider refers to an entity that provides a medium, space, or other venue for the purpose of commercial advertising. There is no predefined limit on the number of Advertising Providers allowable.

Agency/Customer/Client/Direct Advertiser/Agent/Advertising Agency may be an entity that purchases advertising time.

Alternate Advertising Provider may be a second, third, fourth, and etc. Advertising Provider where Events may be booked if an Inventory associated with a Primary Advertising Provider is full as defined in the Order parameters.

Autofill Event/Blind Bonus/Bonus Autofill refers to commercial time that is not filled by paying advertisers that can be automatically filled with extra Events from Orders that are specified as autofill. These Events may be added to an Event list at the time of generation to fill holes left by unsold or unallocated Inventory.

Avail refers to an available place in Inventory into which Events can be scheduled. It may be defined by date/time and length.

Best Time Available (BTA) refers to Events that may be placed anywhere throughout the broadcast day.

Bind To refers to a process by which an Order is tied to specific criteria, in the Order Module, that the scheduler may use to place Events on the daily Program Log. An Order may be bound to, among others, Daypart, Event, Program, Category, or a Fixed/Specific Time.

Bookend refers to a pair of Events with the first Event positioned first in a defined period of time (e.g., a Pod, a Break, etc.) and a second Event positioned last in the same period of time.

Booking Agent (BA) refers to the various embodiments of the scheduling system disclosed herein. Depending on the context, use of the term Booking Agent may refer to the scheduling component of the overall system or it may describe the system as a whole. References to the Booking Agent herein should not be considered limiting but merely as a possible embodiment of the invention.

Booking Score Components include, but are not limited to, Priority, Rate, Customer Loyalty/Client Since Date, and Ordered Date. Booking Score Components may include any attribute that could be derived from the advertiser, the order, and/or the Event as defined in an order placed into Order Module.

Break refers to a designated segment made up of one or more Avails.

Break Type describes an attribute of an Event that may include the class of business or the product such as news sponsorship.

Bump refers to a process of replacing one Event with another based on scheduling parameters.

Bump-wider—Events with a more restrictive (narrow) date range requirement are considered harder to place—in many embodiments, they may take preference in a tie break. Events with a wider date range requirement are easier to place—these may lose in the tie-break scenario and be bumped, because they stand a greater chance of being able to be placed elsewhere.

Clock refers to a range of programming, usually 24 hours, comprised of Programs, Pods, Breaks, Special Events, etc.

Daypart refers to a segment of the 24 HR day.

AMD refers to a block of time associated with the morning hours, generally, 5 AM to 10 AM (0500-0959).

Evening refers to a block of time associated with the evening hours, generally, 7 PM to 12 AM (1900-2359).

Midday refers to a block of time associated with the midday hours, generally, 10 AM to 3 PM (1000-1459).

Overnight refers to a block of time associated with the overnight hours, generally, 12 AM to 5 AM (0000-0459).

PMD refers to a block of time associated with the afternoon hours, generally, 3 PM to 7 PM (1500-1859).

Event refers to a Unit scheduled by embodiments of the invention.

Flex Scheduling refers to instructions given to the AE by the Advertiser, generally, but not exclusively, at the time of ordering, which may specify that an Order/Event may be scheduled anywhere within a given window (e.g., month, week, contract dates, etc.).

Flight/Flight Length refers to a time frame from start to finish of an Order/Event. It may comprise any length of time (e.g., ten minutes, six hours, three days, four weeks, etc.). A single order may contain one or more Flights.

Industry Code refers to an advertiser classification (e.g., automotive, department stores). This may be used to put limitations on an Avail (once an Event from a specific advertiser has been booked) so that other advertisers in the same industry may be excluded from a defined time period (e.g., a Break). A miscellaneous Industry Code may be used to neutralize the blocking effect.

Inserter refers to the point in the delivery stream (e.g., network programming) where commercials are inserted. There is no predefined limit on the number of Inserters allowed.

Interconnect refers to a set of advertising distributed across a group of connected Zones, markets or service areas. Interconnects may be sold as an entire package or broken out into pieces.

Inventory may refer to an Avail or to Events booked into a Break depending on the context in which it is used.

Island refers to a stand-alone Avail of a configurable length of time.

Kill Date defines the end date of a Event.

Kill Time refers to the end time of a Event.

Linked Events refer to two individual pieces that may be linked together to create one Event when aired (e.g., 60 seconds are sold but the content is actually two 30-second Events that are aired back-to-back).

Locked Event refers to a Event that may not be programmatically manipulated. A Locked Event may be activated by a user moving the Event via a computerized interface or by setting the Event as locked.

Log Editor/Playlist Editor refers to a program which allows direct modification of a Program Log.

Make Good refers to a process where an Event may be given an extra date to play because it was missed for some reason.

Market refers to a Zone (e.g., a geographic area that is made up of one or more Advertising Providers).

Max Units refers to the maximum number of Units allowed within a Break.

On-Air Interface refers to a module within the system that generates an electronic copy of the schedule (a "playlist" or "log") for use in transmitting schedule information to an On-Air System.

On-Air System refers to a system that takes information from a traffic system via electronic file transfer (a "playlist" or "log") and transmits programming and Events over the airwaves, or otherwise physically distributes programming and advertising content.

Ordered refers to Events that have been put into the traffic system but have not yet been scheduled to air.

Orderline ID may refer to a system-generated, sequentially unique number assigned to a detail line of the order, and therefore associated with one or more Events sharing the same ordered parameters (i.e. dates, etc. . . . ). For tie-break purposes—when this is configured to be the last Tie-Break Criteria evaluated it guarantees a decision between competing Events because competing Events cannot share the same ID number. This has the effect of the final tie-break decision coming down to a "first come first serve" scenario, since this automatically incrementing number is assigned when the order detail line is saved.

Playlist/Program Log refers to a list of Events and Breaks for a specific date that have been locked and sent to the On-Air System.

Pod refers to a group of two or more contiguous Avails that make up a Break and/or two or more contiguous Breaks.

Pool refers to the remainder of Events that could not be booked into Inventory or that have been directly placed into the Pool.

Position Type refers to an attribute of an Event that directs its placement in a Pod (e.g., premium first—the first Avail in a Pod).

Priority refers to a code given to an Event which represents the importance of its placement in the Log. Events with a high priority may have a higher Booking Score and be scheduled first and may be resistant to Bumping. Events with a low priority may have a lower Booking Score and be scheduled last and may be susceptible to Bumping.

Product Code refers to a classification associated with an Advertiser similar in operation to the Industry Code. In an embodiment, it may be secondary to Industry Code although, in another embodiment, the reverse could be true.

Rate refers to the amount of money an Advertising Provider charges for commercial time. Rates may depend upon daypart, program, packages, and more.

Region refers to a user-defined set of Zones or markets (may be geographic). There is no predefined limit on the number of Regions allowable.

Remote refers to a broadcast that takes place outside of the studio.

Roadblock refers to the same Event placed in the same Avail across multiple media channels (e.g., two or more media channels).

Rotation refers to the movement of a Event for the same client within a given time period.

Scheduled refers to all Events entered into the system that have been booked and placed into an Avail either programmatically or directly.

System Reports refers to reports to assist in managing traffic to recognize potential problem areas.

Tie-Break Criteria may include (but not be limited to) Priority, Event Rate, Bump-Wider, and Orderline ID, which may be used as a final differentiator based on precedence of entry into the system. Like Booking Score, these criteria are completely configurable and may include any attribute that could be derived from the advertiser, the order, or the Event.

Threshold/Threshold Value refers to a degree of successful Roadblock placement, defined by number of Events, Zones or percent of subscribers, below which an Event may become nonbillable.

Traffic and Billing refers to maintaining, forecasting, selling, scheduling, verifying, invoicing, and reporting of commercial and or programming Inventory.

Verification File/Recon refers to a log comprising airtime verification based on what actually aired or didn't within a block of time.

Verified refers to an aired Event that fulfilled the parameters established for that Event in the order.

Zone refers to an area that is made up of one or more Advertising Providers. The area may be defined by geographical or any other business organizational, or even demographical criteria.

A Summary of Some Embodiments of the Invention

Features of the embodiments of the invention, described herein, may be configured within an embodiment of the invention either singly or in combination with other features described herein.

In an embodiment, comprising a method, there may be a computerized method for scheduling advertising Events comprising the steps of (a) allowing a set of advertisers to define a set of criteria for a current advertising Event; (b) comparing an Event pool of available advertising Events against the set of criteria defined in step(a) for the current advertising Event; (c) if an ideal time slot is available, booking the current advertising Event in said ideal time slot; (d) if an ideal time slot is not available, searching a predefined buffer of time around said ideal time slot for a secondary time slot and, if said secondary time slot is available, booking the current advertising Event in said secondary time slot; (e) if no secondary time slot is available, searching all available time ranges for a tertiary time slot and, if said tertiary time slot is available, booking the current advertising Event in said tertiary time slot; (f) if no tertiary time slot is available, comparing a set of values associated with said current advertising Event against a set values associated with one or more previously scheduled advertising Events; (g) if one of said previously scheduled advertising Events is of a lesser value than said current advertising Event, replacing the previously scheduled advertising Event with the current advertising Event and placing said previously scheduled advertising Event into an Event Pool; (h) if said current advertising Event is of a lesser value than said previously scheduled advertising Events, placing said current advertising Event into the Event Pool; (i) periodically checking the Event Pool and attempting to schedule any advertising Events stored therein.

In another embodiment, the method may include the step of defining a set of attributes to be associated with said current advertising Event for the purpose of calculating a score to be associated with said current advertising Event. In another embodiment, the method may include the step of calculating said score to be associated with said current advertising Event. In another embodiment, the method may include the step of utilizing said score in said steps for comparing a set of values associated with said current advertising Event and said previously scheduled advertising Events. In another embodiment, the method may include the step of weighting said set of attributes to be associated with said current advertising Event. In another embodiment the method may include the step of analyzing a set of configurable Tie-Break Criteria if said current advertising Event is equal in value to said previously scheduled advertising Event.

In another embodiment, a computerized method for scheduling advertising Events may include the steps of (a) allowing a set of advertisers to define a set of criteria for a current advertising Event including a primary advertising provider and a secondary advertising provider; (b) comparing a pool of available advertising Events associated with said primary advertising provider against the set of criteria defined in step (a) for the current advertising Event; (c) if an ideal time slot is available, booking the current advertising Event in said ideal time slot; (d) if an ideal time slot is not available, searching a predefined buffer of time around said ideal time slot for a secondary time slot and, if said secondary time slot is available, booking the current advertising Event in said secondary time slot; (e) if no secondary time slot is available, searching all available time ranges for a tertiary time slot and, if said tertiary time slot is available, booking the current advertising Event in said tertiary time slot; (f) if no tertiary time slot is available, comparing a set of values associated with said current advertising Event against a set values associated with one or more previously scheduled advertising Events; (g) if one of said previously scheduled advertising Events is of a lesser value than said current advertising Event, replacing the previously scheduled advertising Event with the current advertising Event and placing said previously scheduled advertising Event into an Event Pool; (h) if said current advertising Event is of a lesser value than said previously scheduled advertising Events, reassessing steps (b) through (g) using a pool of available advertising Events associated with said secondary advertising provider and, if said current advertising Event is not booked using said secondary advertising provider, placing said current advertising Event into an Event pool associated with said primary advertising provider and periodically checking the Event pool associated with said primary advertising provider and attempting to schedule any advertising Events stored therein. It should be noted that variations on this theme are all within the scope of the invention including the execution of various steps in a different order as well as the point in the order at which the system may consider an Alternate Advertising Provider. Furthermore, other embodiments may include additional Alternate Advertising Providers.

In another embodiment a computerized system for scheduling advertising Events may include an order interface and a scheduling engine. The entry screen may be configured to allow an advertiser to define a set of criteria for a current advertising Event and to define a precedence value for a set of booking phases. As used, herein, a precedence value may indicate a placement in an order of steps to be executed by the scheduling engine. The use of a single entry screen to enter order criteria and precedence value is configurable according to the design of the system. The interface may consist of one screen or comprise multiple screens. The interface is intended to be used by an embodiment of the Booking Agent, including the various phases described herein, including, but not limited to one or more of the following, searching for an ideal time slot; searching for a secondary time slot; searching for a tertiary time slot; searching for a prescheduled Event of lesser value than said current advertising Event; and placing said current advertising Event into an Event pool. The precedence value associated with one of said phases from said set of booking phases may be set to a null value (or any other predetermined value). When the scheduling engine is run, it may be configured to execute the various phases, in order, according to said precedence value associated with each of said phases. The scheduling engine may be configured to bypass any of said phases wherein said precedence value associated with said phase is set to a null value.

In another embodiment, a computerized system for scheduling advertising Events comprising (1) a clock module (which may comprise any of the embodiments of clock module described within this specification); (2) an order module (which may comprise any of the embodiments of order module described within this specification); and (3) a Booking Agent (which may comprise any of the embodiments of Booking Agent described within this specification). The clock module may be configured to create an Inventory. The order module may be configured to accept a set of parameters comprising at least one order. The Booking Agent may be configured to a) pull an Inventory from said clock module; b) pull a set of orders from said order module; and c) design a schedule comprising a set of Events based on said Inventory and said set of orders wherein said configuration to design the schedule includes a set of programming configured to i) compare an order from said set of orders against said Inventory; ii) if an ideal time slot is available, book said order as an Event in said ideal time slot; iii) if an ideal time slot is not available, compare a set of values associated with said order against a set of values associated with one or more previously scheduled Events; iv) if one of said previously scheduled advertising Events is of a lesser value than said order, replace said previously scheduled advertising Event with said order in a time slot associated with said previously scheduled advertising Event and place said previously scheduled advertising Event into a pool of Events; v) if said order is of a lesser value than said previously scheduled advertising Event, place said order into a pool of Events; and vi) periodically check the pool of Events and attempt to schedule any orders stored therein.

In an embodiment, the order module may be further configured to calculate a score to be associated with said order entered into the system. That score may be associated with an Event scheduled on the basis of said order. The order manager/module may be configured to permit a user to define a set of attributes to be evaluated to calculate said score.

In another embodiment, the order manager is configured to calculate said score using a set of attributes which may include priority, rate, customer loyalty, and ordered date, or any other attribute of the advertiser, the order, or the Event.

In another embodiment, the order manager is configured to permit said user to define a weight to be associated with each attribute from said set of attributes.

In another embodiment, a computerized system for scheduling advertising Events may further comprise a log editor wherein said log editor is configured to allow a user to directly manipulate said schedule generated by said Booking Agent. This may include the ability to lock an Event.

In another embodiment, the Booking Agent may be further configured to analyze a set of Tie-Break Criteria if said order is equal in value to said previously scheduled advertising Event. The user may define a set of weighted attributes to be evaluated to determine which Event should be favored in a tie-break scenario.

In another embodiment, the Booking Agent may be configured to respond to a change in said Inventory, which results in a new Inventory, by placing said set of Events in said schedule into an Event pool and redesigning said schedule comprising a set of Events based on said new Inventory and said set of Events stored in said Event pool.

In another embodiment, the Booking Agent may be configured to allow a user to define one or more sets of alternative parameters relating to said at least one order and design one or more alternative schedules based on said alternative parameters. The system may be further configured to permit said user to compare any of said schedules created by said system.

In another embodiment, the system may be configured to execute in a multi-threaded environment and wherein a separate thread is allocated to each Advertising Provider in a set of Advertising Providers.

In another embodiment, there may be a computerized system for scheduling advertising Events comprising (1) a clock module; (2) an order module; and (3) a Booking Agent (each of these components may comprise any of the embodiments of such described within this specification). The clock may be configured to create an Inventory. The order module may be configured to accept a set of parameters comprising at least one order. The Booking Agent may be configured to a) pull an Inventory from said clock module; b) pull a set of orders from said order module; and c) design a schedule comprising a set of Events based on said Inventory and said set of orders. The Booking Agent may be configured to respond to a change in said Inventory, which results in a new Inventory, by placing said set of Events in said schedule into an Event pool and redesigning said schedule comprising a set of Events based on said new Inventory and said set of Events stored in said Event pool.

In another embodiment, the order manager may be configured to permit a user to define a Threshold Value as one of said set of attributes to be evaluated to calculate said score. The Threshold Value may be a Boolean value or a percentage value. The Threshold Value may be factored into the Booking Score. If the Threshold Value has not been met then the percentage value may have a positive effect on the Booking Score. If the Threshold Value has been met, the percentage value may have a neutral effect on the Booking Score. If the Threshold Value has been exceeded, the percentage value may have a negative effect on the Booking Score.

BRIEF DESCRIPTION OF THE DRAWINGS

FIG. 2 depicts a sample Inventory structure.

FIG. 5 depicts a sample set of pseudocode that describes a set of functions that may be associated with an embodiment of the invention.

FIG. 6 illustrates a sample general status information report about the operation of an embodiment of the Booking Agent.

DETAILED DESCRIPTION

Other examples, features, aspects, embodiments, and advantages of the invention will become apparent to those skilled in the art from the following description. As will be realized, the invention is capable of other different and obvious aspects, all without departing from the invention. Accordingly, the drawings and descriptions should be regarded as illustrative in nature and not restrictive. It should therefore be understood that the inventors contemplate a variety of embodiments that are not explicitly disclosed herein. Features of the embodiments of the invention, described herein, may be configured within an embodiment of the invention either singly or in combination with other features described herein.

Figure 1:
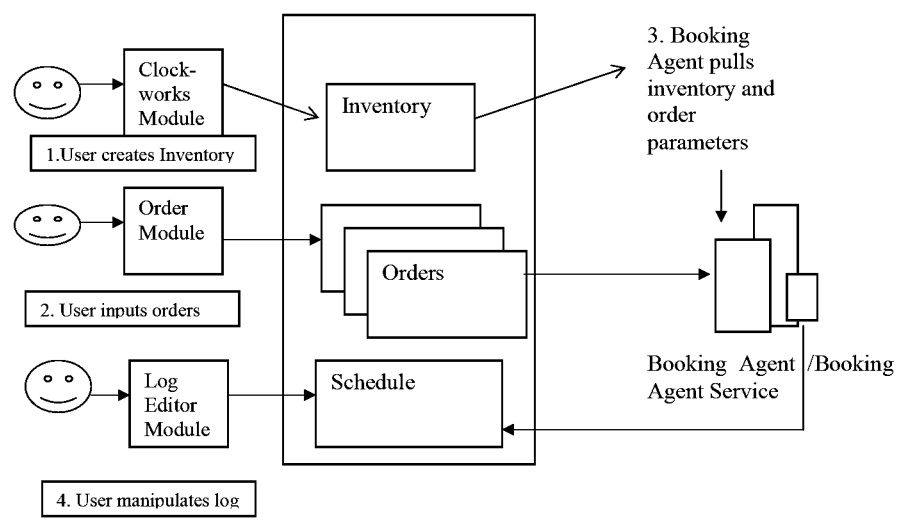
FIG. 1 displays an embodiment of the scheduling system and how these components communicate with each other.
Figure 3:
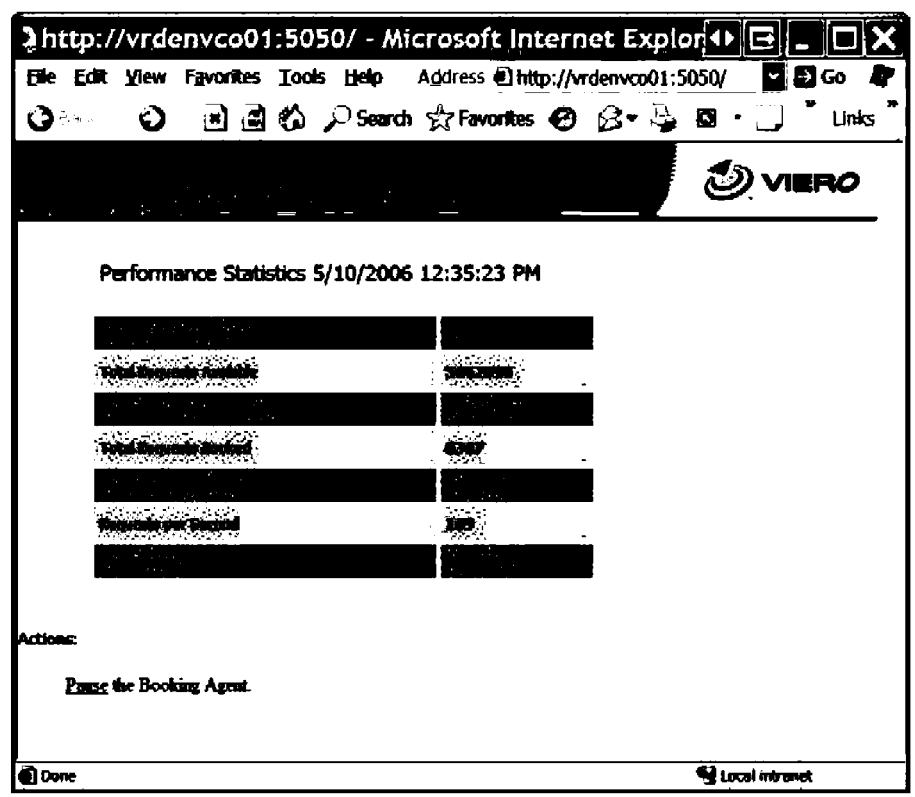
FIG. 3 depicts an embodiment of an interface that may be associated with monitoring the functions of an embodiment of the invention.

Referring to FIG. 1, an embodiment of the invention comprises four components: a Clockworks module (also referred to herein as Clock module), an Order module, a Log Editor module and a Booking Agent or Booking Agent Service. Please note that any of these modules may be combined with others but, for ease of explanation, they shall be referred to individually throughout this application. Referring to FIG. 2, the Clockworks module creates a set of Inventory. The Order Module facilitates the entry of Orders into the system. The Booking Agent pulls Inventory and Orders from the database (or other storage means) and creates the advertising schedule using the specifications provided in the Orders to achieve the best possible placement of Events. A user may utilize the Log Editor module to directly manipulate the schedule.

In the Order Module users may provide the exact specifications for each Order. Specifications may include priority, rate, combinations of priority and rate, time period, maximum Events per day, flexible schedule parameters, multiple Position Types (including user-designated Position Type which may be matched with a default Position Type defined within the Booking Agent module), Break Types, Advertiser separation times (breaks between Events from the same advertiser), Event types and Event lengths per Avail, multi-level Industry Codes, multi-level Product Codes, specific Breaks and specific Pods (including sequencing thereof), and Threshold levels.

Positional criteria refers to an attribute which may be set in the Order Module which indicates a desired placement of the Order when it is booked as an Event. These may include, but are not limited to, the following types:
   Premium First—Booking Agent may book Premium First Events only into Premium First avails.
   Premium Last—Booking Agent may book Premium Last Events only into Premium Last avails.
   Bookend—Booking Agent may book Bookend Events only into Bookend avails.
   Island—Booking Agent may book Island Events only into Island avails.

The system may also be programmed with optimization parameters to generate or validate the schedule based on Maximum Revenue, Most Events Placed, Customer Loyalty, Contract Duration, etc. These parameters may be used by the system to determine which Advertiser to give preference to when there is competition for the same Avail.

Users may also designate specific Bind-To time ranges, as programmed into various embodiments via a computerized interface, including the following:
   User-defined time range
   Standard Daypart
   User-defined Daypart
   Advertising Provider
   Program or Program Category
   Special Event The Order Module may enable users to schedule per Order across multiple Advertising Providers, markets, networks and systems (Zones) within a time-constrained window (a.k.a., Roadblocks). For instance, a user may specify that they wish the same Event to be placed into time-restrained Avail positions across several Advertising Providers in a market or across several markets and across several cable networks in a system (Zone), a market or several markets. Alternatively, a user may specify that they wish to place the same Event into the same Avail across several cable systems within a market. As yet another example, a user may specify that a Roadblock priority may Bump another Event in order to place the entire Roadblock.

Thresholds may apply to Roadblocks. Threshold refers to tracking the percentage of delivery that you actually achieve. For example—if the Threshold for a particular order is 80% and only 75% of what was ordered is delivered (in terms of individual placements of Events across channels) then billing for the entire package is compromised. Booking Agent may be configured to take Thresholds into consideration when it is weighing scheduling decisions.

In an embodiment, Threshold Value may be interpreted as a yes/no Boolean attribute (0=no, >0=yes) from the order information and included in the Booking Score. The Booking Score scale min value may be set to 0 (to represent "no") and the max value may be set to 1 (to represent "yes"). The score may be then weighted as desired and included in the overall Booking Score. This embodiment may result in configurably yet consistently increasing the Booking Score of Events that are being used to reach to Threshold Value.

In another embodiment, the system may be configured to set a Percentage Value for Threshold Events. These may be set to a min value of 0 and a max value of 100, and weighted as desired. During booking, an additional calculation phase may be introduced prior to beginning the normal sequence of booking phases. For each Event, as it is booked, a count may be kept that is used to calculate the percentage met of the Threshold requirement for instances of that Event. Percentage met of Threshold may then be normalized dynamically against the 0 to 100 Booking Score scale for Threshold and the Events Booking Score may be dynamically modified during booking, with an incrementally increasing value. Anything equal to or in excess of 100% of Threshold achievement may be interpreted as a negative modifier in the Booking Score which may lower the Booking Score. A simplistic example is presented for purposes of illustration: An order may be placed for 10 Events with Threshold set at 60%—this means that, if six or more Events place, billing will not be compromised. Three Events have already been placed giving a "Percentage of Threshold Met" (PTM) of 50% (3 of 6). Therefore 50% of the weighted score is used as a modifier to the overall Booking Score for the next Event instance to be evaluated. If that Event places PTM would now be 66% (4 of 6 Events placed), so the next Event would receive a positive modifier of 66% of the weighted score. The fifth Event places, achieving a PTM of 83%, giving a modifier of 83% of the weighted score to the next Event's Booking Score. The sixth Event places achieving 100% PTM. Because 100% of the Threshold has now been achieved, the modifier math now inverts and the remainder of the 10 Events will begin to receive neutral/negative modifiers to their Booking Score. Continuing with the example, the sEventh Event receives a negative modifier –100% of the weighted score but, even with a reduced overall Booking Score, still places, achieving PTM of 117%. The eighth Event is processed, but because it now has a negative modifier of –117% of the weighted score, it cannot place. The ninth and tenth Events are also processed with the –117% modifier and they do not place either.

Figure 4:
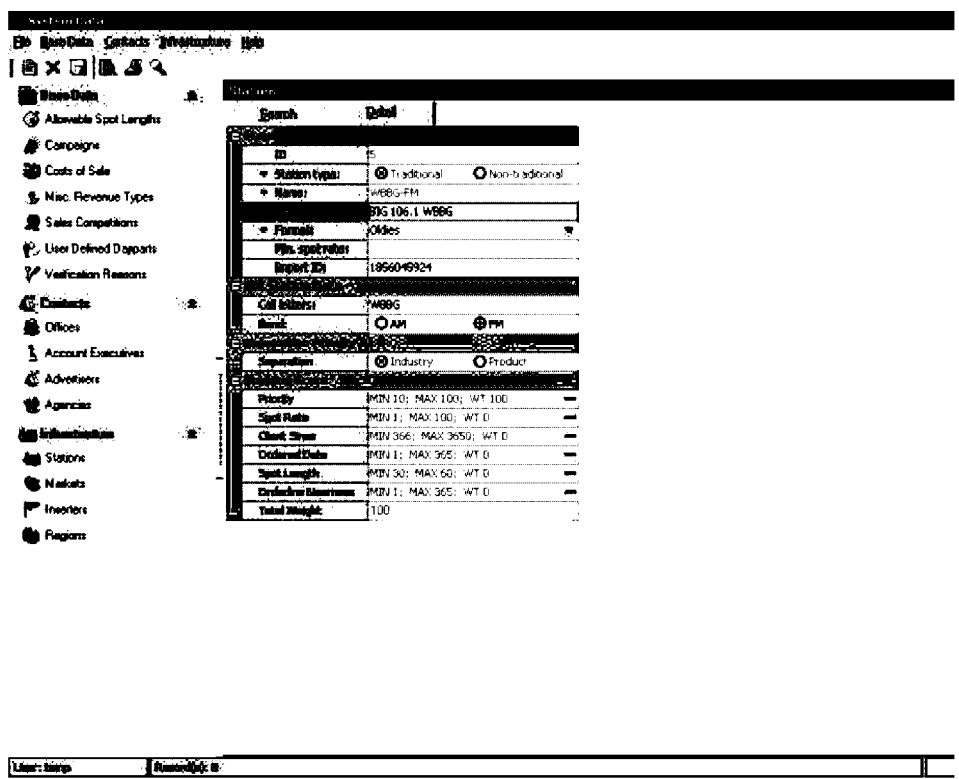
FIG. 4 depicts an embodiment of an interface that may be associated with customizing the relative importance of attributes associated with an Advertising Provider in an embodiment of the invention.

Referring to FIG. 4, Once the order is entered, the value of a Event may be calculated using weighted scoring criteria including, but not limited to, Priority, Rate, Customer Since, Order Start Date, etc. The user may prioritize the relative importance of each attribute per Advertising Provider. A simplified example, for teaching purposes, follows: Priority may be configured to have a minimum of 0 and a maximum of 10, with a weighting of 60%. Rate may be configured to have a minimum of 1 and maximum of 100 with a weighting of 1. Hypothetically, priority is set at 5 and Rate is also set at 5. Because the scales are normalized (or brought into comparative parity with one another), and then weighted—each of these criteria, though both 5, have a different relevance in the final score.

The Orders Module (OM) provides the Booking Agent with the occasion, the ideal date and time for the placement of the Event. The OM creates these occasions so that they are distributed evenly across the correct days and times specified on the Order, thereby creating the possibility of a horizontally and vertically rotated schedule. The OM calculates placement of the occasions to achieve an optimal separation and even spacing across days (horizontal) and across hours (vertical). The system may also consider the history of preceding weeks. It may use the context of preceding week's, or other timeframe, data to configure the current rotation in a way which maximizes exposure based on how the previous week was rotated. A simplified teaching example follows: Five Events must be scheduled to play Monday through Friday, between hours of 1 PM and 5 PM. On Monday, the occasion is created for 1 pm. On Tuesday, it is created for 2 pm. On Wednesday, it is created for 3 pm. On Thursday, it is created for 4 pm, and on Friday, it is created for 5 pm. The five Events are distributed evenly across the days—one on each day, and evenly across hours—one per hour. For the second week, the order of the rotation sequence might be reversed so as to differentiate from the previous week. In an alternative embodiment, either horizontal or vertical rotation (or both) may be randomly generated. In a preferred embodiment, occasions may be pre-scheduled to improve the processing speed of the scheduler.

The Booking Agent may receive occasions in the order they were created by the Order Module. Each occasion, whether it's booked or Pooled is saved in a table (or other memory storage depending upon the configuration of the system). Until an occasion is booked, it remains an occasion, even if it goes to the Pool. Once an occasion is booked, it becomes a Event. If a Event is Bumped to the Pool, it reverts to an occasion, and it will be considered for placement by the Booking Agent.

Next, the Booking Agent places Events in two phases: the "Book" phase and the "Bump" phase.

Book Phase

An embodiment of the Booking Agent may schedule Orders at the Advertising Provider or channel level according to user-prioritized weighted criteria that include, but are not limited to, priority, rate, time period, maximum Events per day, and flex schedule parameters. The system may seek to place all Events up to the maximum number of Events per day specified in the order.

Each of the phases (Book—Ideal, Book—Occasion Hour, Book—Bind To, Bump—By Score, Bump—By Tie Break, etc.) may be given a "precedence" value. The Booking Agent may process each phase in the configured order according to precedence value. These configuration values may be set on a per Advertising Provider basis and may be managed in either a configuration file, or an associated database table structure. The precedence value may also be set to null or "0" or some other predetermined value thus forcing the system to skip that phase.

For example—suppose a particular Advertising Provider requires that only ideal placement be allowed, and that things like searching for anywhere within the occasion hour do not make sense for their business model. An appropriate configuration of phases, numbered for precedence, for this case would be as follows: (1) Book—Ideal; (2) Bump—by Score; (3) Bump—by Tie Break; (4) Pool. All other phases may have a precedence value of "0" and the system will bypass them in designing a schedule.

In the book phase, an embodiment of the Booking Agent may seek to place a Event in its ideal location, called its "occasion." If the ideal time is available, the Booking Agent may book the Order as an Event. Otherwise, the Booking Agent may considering Bumping an Event in the contested location. Otherwise, the Booking Agent may move onto the next step.

An embodiment of the Booking Agent may search for an open time slot (Avail) within the Occasion hour (please note that the system could be otherwise configured to utilize another predefined time period in this phase). If it finds an open Avail, Booking Agent may book the Event. If it cannot find an open Avail, Booking Agent may execute a routine to evaluate Bumping a Event or may move to the next stage.

Embodiments of the Booking Agent may search all available time ranges, as specified by the Bind-to time ranges on the Order. Bind-To time ranges include, but are not limited to, User-defined time range; Standard Daypart; User-defined Daypart; Advertising Provider; Program; and Special Event. An embodiment of the Booking Agent may book Events by "Pod" rather than simply by Break. This may allow the Booking Agent to achieve more accurate Advertiser/Industry Code/Product Code separation. Also, Booking Agent can schedule Bookends over a greater span of time.

An embodiment of the Booking Agent may search for an open time slot (Avail) within the Bind-To time range specified on the Order. When it finds the first open Avail, Booking Agent may book the Order as an Event. If it cannot find an open Avail, an embodiment of the Booking Agent may consider Bumping another Event or may move to the next stage.

An embodiment of the Booking Agent may next consider a broader range of acceptable time ranges in which to schedule Events. These may have been specified in a set of parameters (a.k.a. Auto-Schedule parameters) (e.g., the Occasion week—for every scheduled day in the Occasion week, Booking Agent may check from the beginning of the occasion hour to the occasion time.). With Auto-Scheduling, an embodiment of the Booking Agent may attempt to find an Avail on different days in the same week of the occasion. Auto-Scheduling may start the search at the beginning of the week. For example, if an Order is from Tuesday-Friday and the Booking Agent can't place Events on Friday, then it starts the search for Avails beginning on Tuesday.

An embodiment of the Booking Agent may attempt to place the Event in an open Avail within Auto-Schedule parameters. At each stage of testing, if it cannot find an open Avail, Booking Agent may attempt to Bump a Event or move to the next stage (e.g., as it tests each day within the Occasion Week).

An embodiment of the Booking Agent may next consider an even broader range of criteria. Booking Agent may search for open avails in the Bind To range on days it has exceeded the maximum limit of advertisements for the selected time range (e.g., week, month, contract). It will check within the occasion hour first, and then move onto the Bind To Range using the methods mentioned above. Here, the Booking Agent may be permitted to exceed the MaxDay and MaxWeek limit of the Order. If set to Week, then the MaxDay amount can be violated for that week only. For example, if 10 Events for a week were ordered, but the system was only able to schedule 3 Events, then Flex Scheduling can exceed the MaxDay limit to place the remaining 7 Events in that week (e.g., if Monday and Tuesday both have 6 Avails, then 6 Events may be loaded on Monday and 1 Event may be placed on Tuesday even though the MaxDay limit is 2 advertisements).

Each Break may have one or more allowed Event lengths to provide flexibility in the types of Events scheduled within them. For example, a Break may allow both 30 second Events, and 60 second Events. The Break may be a total of 60 seconds long. Therefore, either one 60 second Event or two 30 second Events may be placed in that Break. Furthermore, if the Break is filled with two 30 second Events and a more important (by Booking Score) 60 second Event comes along—the Booking Agent may bump the two 30 second Events. A Booking Score may be compared in such situations using the following method: the candidate's Booking Score must be greater than the sum of the Booking Scores for the placed Events. If there is a tie—then the tie break evaluation comes into play. In an embodiment, tie break may work as follows: each of the Tie-Break Criteria are compared, one at a time between the candidate and the placed Events. If the first criteria comparison results in the candidate trumping each of the placed Events then the bump proceeds. If any one of the placed Events trumps the candidate—then the bump may not be allowed. If, and only if there is a tie for that Tie-Break Criteria, evaluation moves on to the next Tie-Break Criteria. If the last Tie-Break Criteria results in a tie—then the bump is not allowed.

The Booking Agent may consider Industry Codes and Product Codes to achieve competitive separation based on time limit and/or proximity within a Pod (or other time frame). In an embodiment, the system may be set up so that the Product Code Overrides Industry Code. In this case the Booking Agent will book Events according to Product Code, disregarding Industry Code. In another embodiment, the system may be set up so that two advertisers with the same Industry Code can book into a Pod if the advertisers have different Product Codes. In another embodiment, the system may be set up so that two advertisers, with different Industry Codes, are not placed in the same time period if their Product Codes match. In another embodiment, the system may be set up to reject certain Industry Codes unless an associated Product Code matches a set of Product Codes on a predefined list. In another embodiment, the Booking Agent will book Events according to Product Code and Industry Code. In another embodiment, the Booking Agent may reject/accept Events from the same advertiser (and therefore, the same Industry Code) that have different/same Product Codes. In another embodiment, the Booking Agent may be set up to reject/accept Events with specific industry/Product Codes. The user may also specify a maximum number of advertisements with identical/related Industry Codes and/or Product Codes.

If the time range, in which the program airs, is changed, Booking Agent may remove ("unbook") all of the Events in that time range and rebook them into the new time range that corresponds to the program.

If Inventory, that has already been booked (but not aired), changes, an embodiment of the Booking Agent may respond to these changes by unbooking all Events that are affected by the change and send them to the Pool. Booking Agent may then rebook the Events into the revised Inventory.

In another embodiment, an attribute may be set when the Order is entered into the Order Module which indicates an Alternate Advertising Provider. An embodiment of the Booking Agent may be configured so that, after all configured phases have been run through on the Primary Advertising Provider, and, if the Event/Order is still unplaced, it may be sent to the pool associated with the Alternate Advertising Provider. Another Booking Agent thread, configured to manage the Alternate Advertising Provider, may then pick up that Event/Order and try to place it using one or more of the aforementioned phases in the booking sequence. If the Event/Order is unable to be placed within the schedule for even the Alternate Advertising Provider then the Event/Order may be assigned to the pool for the Primary Advertising Provider (the first provider). The Event/Order may then be picked up and checked regularly against the latest Inventory conditions, first on the Primary Advertising Provider, and then, if necessary, on the Alternate Advertising Provider. In an embodiment, should the Event be bumped by another higher scoring Event, it may be placed in the pool associated with the Primary Advertising Provider. Please note that in additional embodiments there may be more than one Alternate Advertising Provider. Also, various embodiments may exist which vary at what point in the booking sequence the system will consider the Alternate Advertising Provider (e.g., after the ideal time fails, after the secondary time fails, after the tertiary time fails, etc). In other embodiments, it may also be possible to vary how the current advertising Event is disposed of following a failure to book (generally, with the Event pool associated with the Primary Advertising Provider, but the system may be configured to place the current advertising Event into other Event pools).

Bump Phase (Bind-to)

For each date, the Booking Agent seeks to place candidate occasions into the first allowable Break. Within the first allowable Break, it will search for an open Avail. If it cannot find an open Avail, it looks for a scheduled Event to Bump. In an alternative embodiment, the Bump phase may be configured to trigger at the end of a search for an open Avail or at one or more phases in the search for an open Avail (e.g., after the search for an ideal time slot; after the secondary time slot criteria are considered, after the tertiary time slot criteria are considered, etc. or, alternatively, after the search for an ideal time slot, after the search for Avails within the same hour as the ideal time slot, after the search for Avails within the Bind To range, after the search for Avails within the Auto-schedule criteria, and after the search for Avails within the Flexible parameters criteria).

At the point when the Booking Agent has searched the allowable Break and has not found an open Avail, the Booking Agent may compare a pre-calculated composite score (which may have been calculated in the OM) for an occasion(s) within the Order and begin comparing the occasion(s) to scheduled Events. The Booking Agent may compare the score of an Order with the score of the booked Event. The system may be configured so that the higher score wins. If the booked Event has a lower score than the occasion, it may be Bumped to the Pool. If the Order has a lower number, the Booking Agent will continue looking for an Event to Bump. Whenever the Booking Agent compares the Order to a scheduled Event, it calculates the composite score for the scheduled Event. Alternatively the composite score for the Event may have been pre-calculated and stored in memory.

There may be two configurable areas in the Event scoring process: weight and tie-Break sequence. In the configuration file (or equivalents thereof including, but not limited to a database table structure), the user can assign relative weights to Priority and Rate. If the user does not customize the Event scoring formula, the Booking Agent may compare Events based on Priority, then Rate, then Bump Wider, then Order Line ID. The system assigns a composite score to every Order/Event. The composite score is a combination of the relative weights of scoring criteria. The Booking Agent uses the composite scores of Events to make Bumping decisions. The order in which Tie-Break Criteria are considered is completely configurable.

An embodiment of the Booking Agent may Bump a booked Event if the candidate has a higher value than the Event that has previously been booked. If two competing Events have the same scores, Booking Agent will use tie-Break criteria.

If Priority is higher on the occasion, it may Bump the Event. If it is less, it may lose, if it is the same, it may move to the next tie Break setting of Rate.

If Rate is higher on the occasion, it may Bump the Event. If it is less, it may lose, if it is the same, it may move to the next tie Break setting of BumpWider.

In BumpWider, Events with a tighter time range may beat out Events with a wider time range. This may work on all parameters including, but not limited to, fixed time, daypart and user-defined daypart. If all of the tie Breaks are still the same, it may move to the next phase.

If Booking Agent can Bump an Event, the Event that was previously booked may be Bumped to the Pool, and the candidate may be booked. If Booking Agent cannot Bump an Event in order to place the candidate, it may move to the next stage (Pool).

Booking Agent can Bump an Event that has a different length than the candidate. For example, Booking Agent can Bump a 60-second Event in order to place a 30-second Event, if the 30 has a higher score. Additionally, Booking Agent can Bump two Events to place one Event, if the candidate has a higher score than the combined score of the booked Events (e.g. Two 30-second Events can be Bumped by one 60-second Event). If the system is attempting to Bump two or more shorter Events with a longer candidate, it may search for all eligible Events within a Break (or other time block) by following one or more of these steps to find the ideal bump Event(s):

Look for Events with the same industry code and/or product code.

Look for an Advertiser with the same product code.

Check for positional Events to Bump.

Check for dependencies within the Pod, specifically Bookends (i.e. if you bump one bookend its "sibling" has to go as well).

Check whether the Events that are eligible to be Bumped provide enough time to place the candidate.

When the Booking Agent finds enough time within the Break to place the candidate, it may compare the candidate's scores with the Event(s) to be Bumped (the Booking Agent always seeks to Bump the Events with the lowest scores first).

If the candidate's composite score is higher than that of the Event(s) eligible to be Bumped, the Event(s) may be Bumped and the candidate may be booked.

In case of a tie, the Booking Agent may perform tie-Breaks until the tie is broken. If the candidate is tied with multiple Events to be Bumped, the Booking Agent may perform tie-Break comparisons between the candidate and each Event to be Bumped.

Pool

All Events that embodiments of the Booking Agent cannot place may go to the Pool. The Booking Agent may periodically, automatically reattempt to book occasions from the Pool into available Inventory.

Optimization/Rebooking

Booking Agent may optimize continuously as it takes both new and revised orders as well as changes in Inventory into account. Booking Agent may respond to changes to booked order lines with minimal impact to users and to the schedule that is already booked. Booking Agent may allow users to continue to work while the BA is handling revisions to an order line.

In some embodiments, Booking Agent may perform Autofill according to user-defined parameters.

Reports

Booking Agent may provide the ability for users to generate reports on schedules to evaluate possible direct manipulation via the Log Editor module of the generated schedule. Report may identify less than ideal configurations. For example, if an Island Avail is filled with a non-Island Event, the Island Avail will be reported as available.

Booking Agent may also provide reports regarding when an Event was booked, when a Event was Bumped, why a Event was Bumped, why a Event was Pooled, and who booked or Pooled a Event, if it was a Log Manager user.

Manual Manipulation

Once the Booking Agent generates a schedule, a user may directly manipulate the schedule through the Log Manager. The Log Manager may allow the user to override Booking Agent decisions and manually designate where a Event is placed. The user may also be able to override where Booking Agent placed an Event. If the user locks the Event to its user-designated position, the Booking Agent may no longer consider the Event for replacement.

When the Log Manager moves a Event from one Break to another (or to the Pool), the Booking Agent may be triggered that the Event has been moved and perform the necessary modifications and updates.

When the Log Manager moves an Event from one Avail in a Break to another Avail in the Break, the Booking Agent knows that Event has been moved and may perform the necessary modifications and updates.

When the Log Manager moves an Event from the Pool to the schedule, the Booking Agent may know that the Event has been booked and performs the necessary modifications and updates.

When the Log Manager moves an Event, the Booking Agent may lock that Event to prEvent it from being Bumped in subsequent evaluations until/unless the Event is unlocked.

Predictive Modeling

A separate copy of the Booking Agent (and its associated databases) may be created to allow a user to adjust Booking Score settings and see what those changes would mean in terms of actual revenue based on orders that are in the system now (without impacting actual booking). The user may utilize an interface to interact with the mock Booking Agent. This may be utilized to examine the trade-offs that would come into play when, for example, the user favors, for instance, ordered date over pure Event rate.

In an alternative embodiment, an embodiment of the Booking Agent may include a Booking Score Evaluation module. This module may be configured to allow a business person to review/compare an alternative schedule by varying the configuration settings for a set of orders. Alternatively, the same analysis could be applied to a historical set of data. In an embodiment the following components may be offered to achieve this functionality. A user interface may be provided to allow a user to select an Advertising Provider to analyze. The user interface may include the ability for the user to select a date/time range. An engine may retrieve a copy of Inventory for the indicated time range from the database and store in the copy in a computer memory (RAM, permanent storage, etc.). Next, the engine may retrieve a copy of Ordered information for that Advertising Provider within the specified date range. A user interface may be provided to allow a copy of the Advertising Provider's Booking Score configurations to be modified. The user may then execute the scheduling engine on said order using the modified configuration. Multiple iterations of this steps may be performed by the system with the ability to store the results for review and comparison. Additional analyses may be performed on said results, which may be presented to the user, including total revenue, total units booked, Inventory utilization (% of Inventory used). This display may be adjustable to report values in summary form, or broken into time ranges, such as weekly or monthly. This display may also offer the ability to plot these values over time using a graphical mechanism such as a line chart or histogram or other appropriate graphical way of representing values over time. The display may also be configured to visually compare multiple sets of such results.

Remote Monitoring and Control Capability

Referring to FIG. 6, embodiments of the invention may include a configuration which permits the Booking Agent to be monitored from a remote location. It may also allow certain commands and configurations to be administered by remote personnel. Remote communication with the Booking Agent may be achieved via the HTTP protocol, a standard internet protocol commonly used to access and serve HTML and other web documents.

The Booking Agent engine may also function as a specialized web server and may be configured to accept the following HTTP encoded requests, perform the requested action, and respond with a properly formatted HTML response. An embodiment of the Booking Agent may contain support for any or all of the following, or other similar commands or requests.

Login Request
A. This requires that a user name and password be authenticated against a secure list of known and approved users. All other commands are rejected unless the remote user has been properly authenticated.
B. Upon successful authentication the Default view is displayed (see "Default View" below).

Pause Request:
A. If successful then respond with an HTML document containing the text "Booking Agent paused at [list date and time].
B. If not successful then respond with an HTML document containing the text "Unable to Pause the Booking Agent."

Resume Request:
A. If successful then respond with an HTML document containing the text "Booking Agent has resumed processing at [list date and time]."
B. If not successful then respond with an HTML document containing the text "Unable to resume Booking Agent processing."

Set Thread Command:
A. This command requires parameter t, to represent the number of threads to set the Booking Agent to run.
B. If successful then respond with an HTML document containing the text "Thread count set to [new number]."
C. If not successful then respond with an HTML document containing the text "Unable to set the new thread count."

Assign Provider Command
A. This command is used to assign one or more Advertising Providers to a Booking Agent instance. Each provider may then be managed by a separate thread within the Booking Agent instance. This is useful for situations where there are numerous providers being managed within one system, and the workload of these providers needs to be distributed across multiple instances of the Booking Agent.
B. This command requires the parameter, pList, which is a comma delimited list of Provider Names, or the value "*" which indicates that all Providers are to be managed by this instance of a Booking Agent.
C. If successful then respond with an HTML document containing the text "Booking Agent now assigned to manage [list the Providers].
D. If not successful then respond with an HTML document containing the text "Unable to assign requested providers to Booking Agent."

Set Email Notification
A. This command is used to change or set the email address that the Booking Agent sends notifications to. An embodiment of the Booking Agent may be configured to send notifications to an email address upon start up, shut down, pause, and resume. This can be useful to detect unexpected shutdowns of the Booking Agent, which could happen for example, if a server is powered down.
B. This command requires the parameter email, which should contain a properly formatted and valid email address.
C. If successful then respond with an HTML document containing the text "Email Notification address set to [list the new email address.]
D. If not successful then respond with an HTML document containing the text "Unable to change email notification address."

Default View Request
Referring to FIG. 6, this request results in an HTML document giving a display of general status information about the operation of the Booking Agent.

Architecture

In an embodiment, the Booking Agent is architected to schedule in real time although embodiments may also be configured in near real time and batch mode. It may run as a Windows Service. Data storage may be handled via a Microsoft SQL Server 2000 installation, or any other relational database management system (RDBMS) while Event booking may be managed via collection objects stored and parsed in application dedicated memory. Multiple Booking Agents may work on the same Inventory at the same time. A locking scheme allows synchronous operations by facilitating management of contested Inventory.

From a performance standpoint, it may be possible to improve the performance of the current scheduling algorithm by using different structures, such as balanced trees. Performance may also be improved by introducing asynchronous operations during scheduling preparation (get Inserters, Inventory, order lines).

Having shown and described various embodiments and concepts of the invention, further adaptations of the methods and systems described herein can be accomplished by appropriate modifications by one of ordinary skill in the art without departing from the scope of the invention. Please note that the use of the word "may" throughout the specification to describe various embodiments is intended to be permissive and not indefinite. The term "may" encompasses, in addition to the described embodiment, such potential alternatives, modifications, variations, etc, that will be apparent to those skilled in the art in light of the foregoing teachings. Accordingly, the invention is intended to embrace all such alternatives, modifications and variations, and is understood not to be limited to the details of structure and operations shown and described in the specification and drawings.

What is claimed is:

1. A computerized method for scheduling advertising events in selectable booking phases, comprising:
defining a set of criteria for a current proposed advertising event, the criteria including a precedence value that relates to phase selection, a first time parameter, a second time parameter and a third time parameter wherein the second time parameter has a broader time range and a lower preference than the first time parameter and the third time parameter has a broader time range and a lower preference than the second time parameter, by executing first program instructions in a computer system;

comparing the first time parameter to available advertising inventory, by executing second program instructions in the computer system;

booking the proposed advertising event in a first time slot when the first time slot meets the first time parameter, by executing third program instructions in the computer system;

searching a predefined time range proximate to the first time parameter to locate a secondary time slot when the first time slot cannot be located according to the first time parameter, and booking the proposed advertising event in said secondary time slot when said secondary time slot meets the second time parameter, by executing fourth program instructions in the computer system;

searching the available advertising inventory to locate a tertiary time slot when the secondary time slot cannot be located according to the second time parameter, and booking the proposed advertising event in said tertiary time slot when said tertiary time slot meets the third time parameter, by executing fifth program instructions in the computer system;

comparing at least one value associated with said proposed advertising event against at least one value associated with at least one previously scheduled advertising events when the tertiary time slot cannot be located according to the third time parameter, by executing sixth program instructions in the computer system;

replacing the at least one previously scheduled advertising event with the proposed advertising event and placing said at least one previously scheduled advertising event into an event pool when the previously scheduled advertising event is of a lesser value than the proposed advertising event, by executing seventh program instructions in the computer system;

placing said proposed advertising event into the event pool when said proposed advertising event is of a lesser value than said previously scheduled advertising event, by executing eighth program instructions in the computer system;

checking the available advertising inventory and the event pool and scheduling an advertising event in the event pool when the available advertising inventory has an availability that meets the set of criteria, by executing ninth program instructions in the computer system.

2. The method of claim 1 further comprising locating a different advertising provider having inventory for the events in the pool, and repeating said booking, searching and replacing with the different advertising provider's inventory.

3. The method of claim 1 further comprising determining a first value to be associated with said proposed advertising event based on attributes of the proposed advertising event and determining a second value to be associated with the at least one previously scheduled advertising event based on attributes of the at least one previously scheduled advertising event.

4. The method of claim 3, wherein the comparing a set of values associated with said proposed advertising event and said previously scheduled advertising events is performed using said first and second values.

5. The method of claim 4, further comprising performing a tie-break operation when the first value is equal to a sum of booking scores for the at least one previously scheduled advertising event.

6. The method of claim 5, further comprising analyzing a set of configurable tie-break criteria when said first value is equal to said second value.

7. A method for scheduling advertising events comprising:

defining a set of criteria for a proposed advertising event to be serviced by a primary advertising provider and a secondary advertising provider, the set of criteria including time parameters, and the primary and secondary advertisers having available advertising inventory, by executing first program instructions in a computer system;

comparing the set of criteria to a first pool of available advertising events associated with said primary advertising provider by executing second program instructions in the computer system;

booking the proposed advertising event in a first time slot in the primary advertiser's inventory when the first time slot meets the timing parameters, by executing third program instructions in the computer system;

searching a predefined time range proximate to the first time slot to locate a secondary time slot when no first time slot is available, and booking the current advertising event in said secondary time slot when said secondary time slot is within the predefined time range, by executing fourth program instructions in the computer system;

searching available time ranges for a tertiary time slot when no secondary time slot is available and booking the proposed advertising event in said tertiary time slot when said tertiary time slot is available, by executing fifth program instructions in the computer system;

comparing a set of values associated with said proposed advertising event against a set values associated with at least one previously scheduled advertising event when no tertiary time slot is available, by executing sixth program instructions in the computer system;

replacing the at least one previously scheduled advertising event with the proposed advertising event and placing the at least one previously scheduled advertising event into the first event pool when the at least one previously scheduled advertising event is of a lesser value than said current advertising event, by executing seventh program instructions in the computer system; and comparing the set of criteria to a second pool of available advertising events associated with said secondary advertising provider, placing said proposed advertising event into the first event pool, periodically checking the first event pool and scheduling advertising events stored therein when said proposed advertising event is not booked by said secondary advertising provider, by executing eighth program instructions in the computer system.

8. A system for scheduling advertising events comprising:
computer memory;
an order interface having an entry screen; and
a scheduling engine coupled to the order interface;
said entry screen to allow an advertiser to enter a set of criteria that defines a proposed advertising event and to enter a precedence value of each booking phase in a set of booking phases including a unique value indicating that the advertiser does not want to execute a particular booking phase;

said scheduling engine to create and store in said computer memory an advertising schedule by executing said set of booking phases, the booking phases including searching to locate a first time slot, searching to locate a secondary time slot, searching to locate a tertiary time slot, searching to locate a prescheduled advertising event of lesser value than said proposed advertising event, and placing said proposed advertising event into a proposed event pool when the first time slot, second time slot, tertiary time slot and prescheduled event of lesser value are not located; and said scheduling engine to selectively execute said phases according to said precedence values.

9. A system for scheduling advertising events comprising:
computer memory;
a clock module;
an order module coupled to said clock module; and
a booking agent coupled to said order module;
said clock module to create advertising inventory;
said order module to accept a set of parameters defining an advertising order;
said booking agent to retrieve advertising inventory related data from said clock module, retrieve a set of advertising orders from said order module, and assemble and store in said computer memory an advertising schedule comprising a set of advertising events based on said advertising inventory and said set of advertising orders by:
comparing an advertising order from said set of advertising orders against said advertising inventory;
booking said advertising order as an event in a predefined time range when a time slot is available in said advertising inventory;
comparing a set of values associated with said advertising order against a set of values associated with one or more previously scheduled advertising events;
replacing said previously scheduled advertising event with said advertising order in a time slot associated with said previously scheduled advertising event and placing said previously scheduled advertising event into a pool of unbooked events when one of said previously scheduled advertising events is of a lesser value than said advertising order;
placing said advertising order into the pool of unbooked events when said order is of a lesser value than said previously scheduled advertising event; and
periodically checking the pool of unbooked events and scheduling advertising orders stored in the pool of unbooked events.

10. The system of claim 9 wherein said order module searches advertising inventory in a different geographic zone when the order is not booked.

11. The system of claim 10 wherein said booking agent associates a score with an event scheduled on the basis of said advertising order.

12. The system of claim 11 wherein said order manager permits a user to enter a set of attributes of said order used to calculate said score.

13. The system of claim 11 wherein said order manager calculates said score using a set of attributes including priority, rate, customer loyalty, and ordered date.

14. The system of claim 12 wherein said order manager permits said user to enter a weight to be associated with each attribute from said set of attributes.

15. The system of claim 9 further comprising a log editor to permit a user to modify said advertising schedule assembled by said booking agent.

16. The system of claim 15 wherein said log editor permits a user to lock a scheduled advertising event preventing the scheduled advertising event from being replaced.

17. The system of claim 9 wherein said booking agent analyzes a set of tiebreak criteria when said advertising order has a score that is equal to a score of said previously scheduled advertising event.

18. The system of claim 17 wherein said booking agent permits a user to enter a set of weighted attributes of an order, and executes a tie-break scenario based on said weighted attributes.

19. The system of claim 9, wherein said booking agent responds to a change in said advertising inventory, which results in a new advertising inventory, by placing said set of advertising events into an available advertising event pool and updating said advertising schedule based on said new advertising inventory and said set of unbooked events stored in said unbooked event pool.

20. The system of claim 9, wherein said booking agent allows a user to enter one or more sets of alternative parameters relating to said at least one advertising order and to assemble one or more alternative advertising schedules based on said alternative parameters.

21. The system of claim 20, wherein said booking agent compares said advertising schedule with the alternative advertising schedules.

22. The system of claim 18 wherein said booking agent executes in a multithreaded environment and wherein a separate thread is allocated to each advertising provider in a set of advertising providers.

* * * * *